Figure 1:
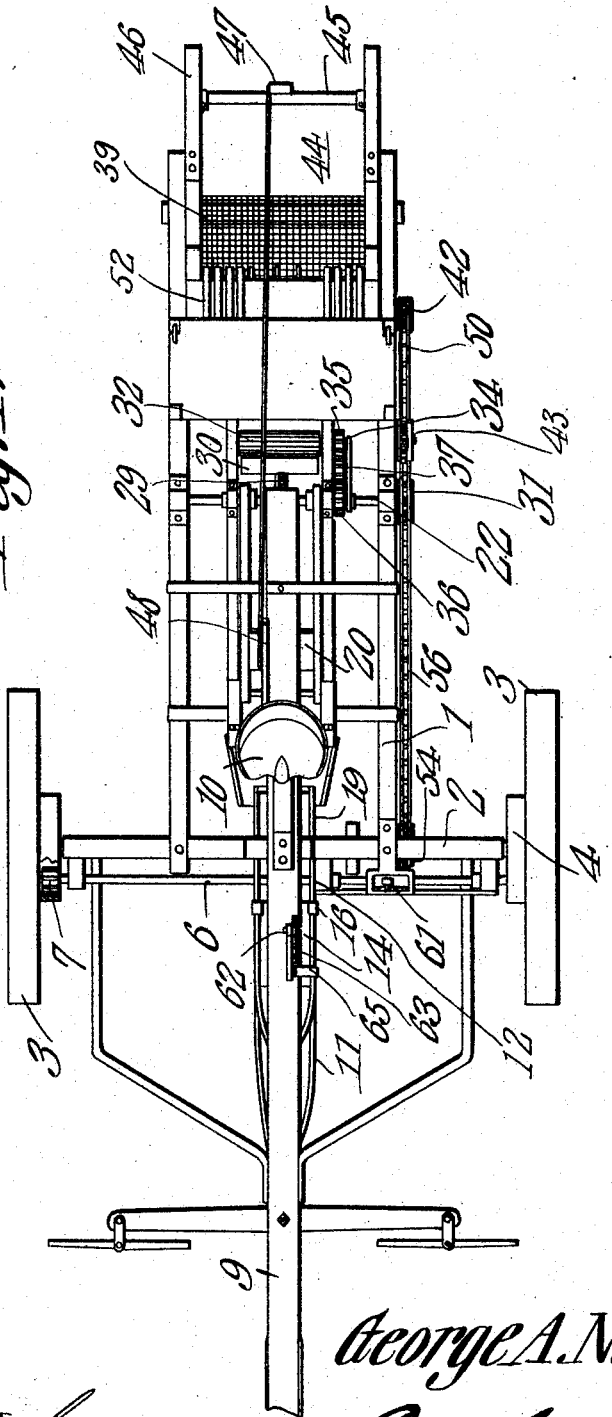

G. A. NELSON.
GRASS DESTROYER.
APPLICATION FILED JULY 10, 1909.

947,252.

Patented Jan. 25, 1910.
4 SHEETS—SHEET 2.

Fig. 2.

Witnesses

Inventor
George A. Nelson.
By C. A. Snow & Co.
Attorneys

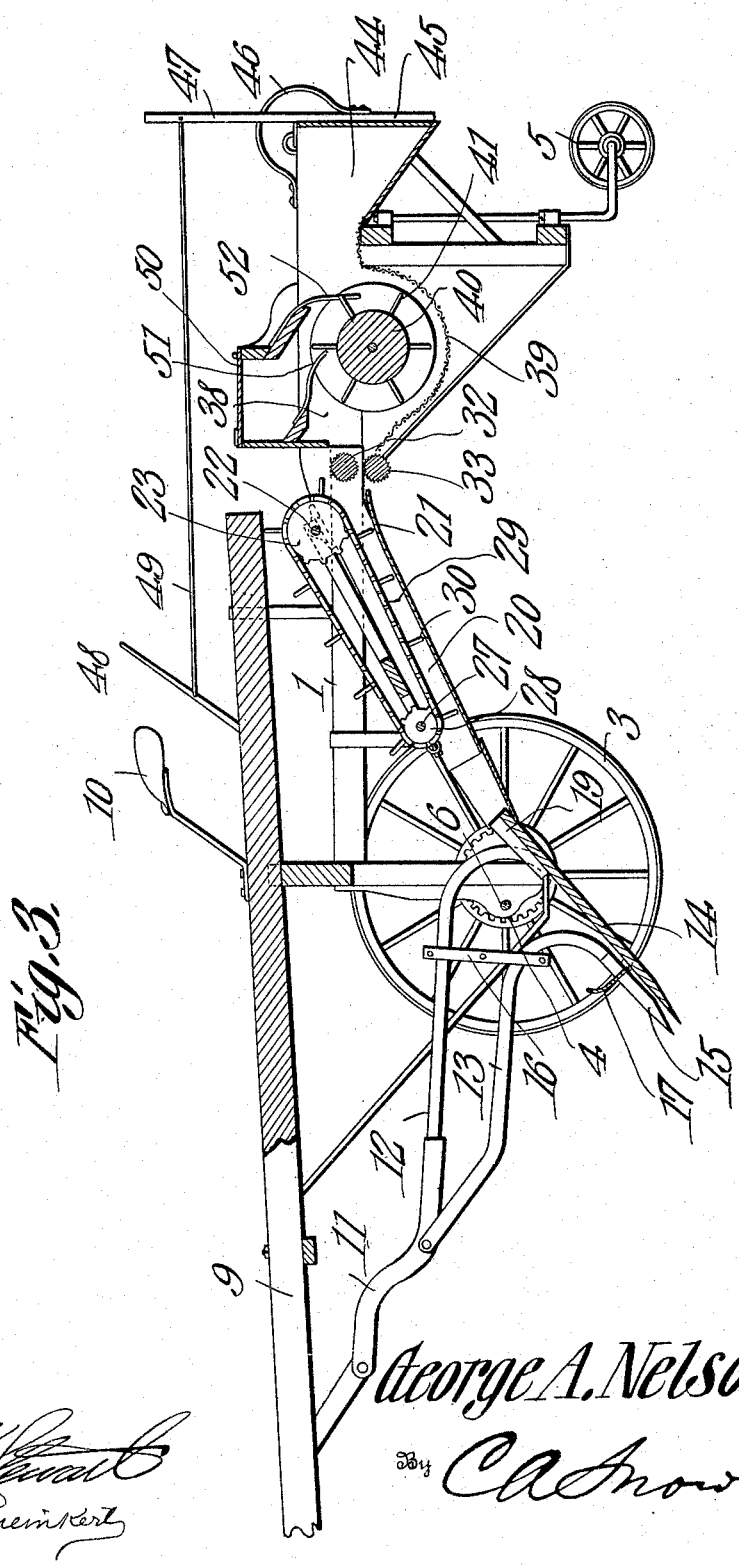

G. A. NELSON.
GRASS DESTROYER.
APPLICATION FILED JULY 10, 1909.
947,252.
Patented Jan. 25, 1910.
4 SHEETS—SHEET 4.
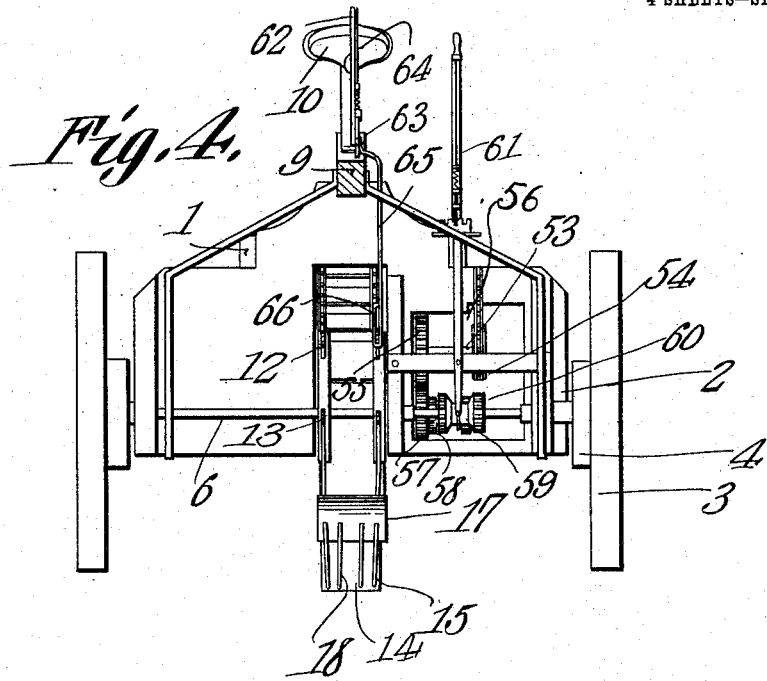
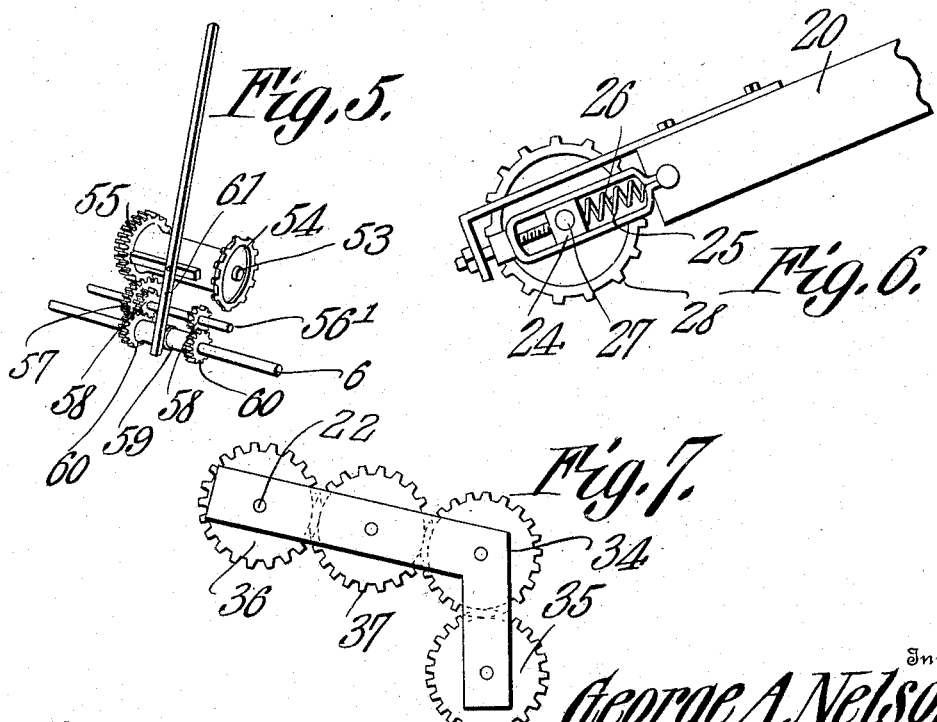
Witnesses
Inventor
George A. Nelson
By C. A. Snow & Co.
Attorneys

UNITED STATES PATENT OFFICE.

GEORGE ABNER NELSON, OF TIMPSON, TEXAS, ASSIGNOR OF ONE-HALF TO JOHN THOMAS PEDDY, OF TENAHA, TEXAS.

GRASS-DESTROYER.

947,252.

Specification of Letters Patent. Patented Jan. 25, 1910.

Application filed July 10, 1909. Serial No. 506,987.

*To all whom it may concern:*

Be it known that I, GEORGE ABNER NELSON, a citizen of the United States, residing at Timpson, in the county of Shelby and State of Texas, have invented a new and useful Grass-Destroyer, of which the following is a specification.

This invention has relation to grass destroyers, and it consists in the novel construction and arrangement of its parts, as hereinafter shown and described.

The object of the invention is to provide a simple and effective implement for destroying pestilent grasses and similar objectionable vegetable growth, and, with this object in view, the implement includes a wheel-mounted frame having an elevator, and means for mutilating or disintegrating the tufts of grass or vegetable growth, and for sifting the soil from the roots and stems of the same. Means are also provided for holding the vegetable growth in a hopper until it is desired to deposit the same in a pile upon the surface of the soil. Connected with the implement are means for removing stones and other obstacles on or in the ground, cutting the sod or roots and for delivering the same to the said elevator.

In the accompanying drawings:—Figure 1 is a top plan view of the grass destroyer. Fig. 2 is a side elevation of the same. Fig. 3 is a longitudinal sectional view of the same. Fig. 4 is a front elevation of the same. Fig. 5 is a perspective view of a gear clutch mechanism used in the implement. Fig. 6 is a side elevation of the lower part of an elevator trunk used in the implement. Fig. 7 is a side elevation of a train of gear wheels used upon the implement.

The grass destroyer comprises a frame 1, which is mounted upon an axle 2, upon which are journaled traction wheels 3. Concentrically mounted upon the traction wheels 3 are internal gear rims 4. The rear portion of the frame 1 is supported by freely castered wheels 5. A shaft 6 is journaled for rotation in suitable bearings, and is located in front of the axle 2. Pinions 7 are journaled upon the ends of the shaft 6 and mesh with the gear rims 4.

A tongue 9 is attached to the frame 1 and forms a spine for the same. An operator's seat 10 is mounted upon the rear portion of the tongue 9. A beam 11 is pivotally con- nected at its forward end with the rear portion of the tongue 9, and standards 12 and 13 are connected with the rear portion of the said beam 11. The standards 12 support a cutting share 14 in an inclined position and the rear ends of the standards 13 are fashioned into or support cutting blades 15. Braces 16 connect the standards 12 and 13 together and hold the same relatively in fixed position. A shield 17 is supported by the blades 15, and attached to the said shield, and at points between the blades 15 are supplementary cutting blades 18. The upper rear portion of the share 14 is provided at its side edges with upstanding walls 19, and the upper rear end of the said share 14 is disposed over the lower end of an inclined elevator trunk 20. The bottom of the trunk 20 at the lower forward portion of the same is rigid with the sides thereof, but the said bottom at the upper rear portion of the said trunk as at 21, is free to swing down under excessive weight or pressure. The bottom of the trunk is preferably formed of sheet metal and, consequently, possesses sufficient resiliency to cause the upper portion 21 thereof to assume its normal position when relieved of excessive weight or obstructions, as indicated.

A shaft 22 is journaled for rotation at the upper rear end of the trunk 20, and upon the said shaft is fixed a sprocket wheel 23. Boxes 24 are slidably mounted in the sides of the trunk 20 at the lower end thereof, and are held in lowermost positions in the slots 26 by coiled springs 25, which bear at one end against the upper ends of the slots, and at their lower ends against the said boxes. A shaft 27 is journaled for rotation in the boxes 24, and a sprocket wheel 28 is fixed to the said shaft 27. A sprocket chain 29 passes around the sprocket wheels 23 and 28, and blades 30 are fixed at intervals to the said sprocket chain 29. The said blades 30 at the lower run of the chain 29 are adapted to sweep along the upper portion of the bottom of the trunk 20. A sprocket wheel 31 is also fixed to the shaft 22 and is located beyond one side of the frame 1.

Corrugated rollers are journaled for rotation at the upper end of the trunk 20, said rollers being designated as 32 and 33 in the drawings, and are provided upon their shafts respectively with intermeshing gear wheels 34 and 35. Consequently, the adjacent portions of the said rollers rotate toward each other, while the rollers are spaced apart slightly, as indicated in Fig. 3 of the drawings. A gear wheel 36 is fixed to the shaft 22 and meshes with an intermediate gear wheel 37 journaled to the side of the trunk 20, which, in turn, meshes with the gear wheel 34 above referred to. Thus means are provided for transmitting rotary movement from the shaft 22 to the rollers 32 and 33, and, as will hereinafter appear, means are provided for transmitting rotary movement from the traction wheels 3 to the said shaft 22. A chamber 38 is located behind the rollers 32 and 33, and is provided with a foraminous concave bottom 39. A cylinder 40 is journaled for rotation in the chamber 38 and is provided upon its periphery with a series of radially disposed teeth or pins 41. A sprocket wheel 42 is fixed to the shaft of the cylinder 40, and is located beyond one side of the frame 1, and an idle sprocket wheel 43 is journaled to the side of the said frame 1.

A hopper 44 is located behind the delivery end of the concave 39, and the rear end of the said hopper 44 is normally closed by means of a hinged gate 45. Springs 46 are fixed at their forward ends to the frame 1, and bear at their rear ends against the rear side of the gate 45, and are under tension with a tendency to hold the said gate 45 in a closed position against the rear end of the hopper 44. An upstanding bar 47 is fixed to the gate 45, and a lever 48 is fulcrumed upon the frame 1 of the implement. A connecting rod 49 is pivotally attached at its ends with the upstanding bar 47 and the lever 48. Thus it will be seen that means are provided for opening and closing the gate 45 when the lever 48 is swung manually by one occupying the seat 10. The bottom of the hopper 44 is downwardly and rearwardly inclined, as indicated in Fig. 3 of the drawings.

The chamber 38 is normally covered by a hood 50, to which are attached two sets of fender teeth 51 and 52. The sets 52 are located in the vicinity of the ends of the cylinder 40, while the set 51 is located in the vicinity of the middle of the said cylinder. The teeth 51 and 52 project down into the spaces between the pins 41 and are adapted to remove roots and other vegetation from the same as the cylinder rotates, as will hereinafter be described.

A shaft 53 is journaled upon the frame 1 and is provided at one end with a sprocket wheel 54, and at its other end with a gear wheel 55. A sprocket chain 56 passes around the wheel 54, and from thence the upper run of the said sprocket chain passes over the sprocket wheel 31, thence under the idler 43 and around the sprocket wheel 42 back to the sprocket wheel 54. Another stub-shaft 56' is journaled to the frame 1 and is provided at one end with a gear wheel 57 which meshes with the gear wheel 55 upon the shaft 53. The shaft 56' is further provided with fixed gear wheels 58 which are spaced one from the other. A sleeve 59 is feathered upon the shaft 6, and is provided at its ends with wheels 60, which are adapted to mesh with the gear wheels 58 upon the shaft 56'. A lever 61 is fulcrumed to the frame 1 and is provided with a bifurcated end which engages the sleeve 59, and, as the said lever 61 is swung upon its fulcrum, the said sleeve 59 is moved longitudinally along the shaft 6, whereby the wheels 60 carried by the said sleeve may be brought into engagement with the gear wheels of the shaft 56', or may be moved out of engagement with the said gear wheels. A lever 62 is fulcrumed upon the implement adjacent the gear segment 63. A spring-actuated pawl 64 is carried by the lever 62 and is adapted to engage the teeth of the segment 63. A link 65 depends from the working end of the lever 62 and is provided at its lower portion with a loop 66, which receives one of the standards 12. Thus it will be seen that by swinging the lever 62 the link 65 may be moved longitudinally, whereby the standards 12 and 13 may be raised or lowered, and when the said lever 62 is so positioned that the standards are in lowered position, there is sufficient room afforded by the loop 66 to permit the said standards to swing upward to a limited extent in case the share 14 or the blades 15 encounter obstructions.

The operation of the implement is as follows:—As the same is drawn along the surface of the ground the blades 15 and 18 will engage the turf or sod and remove all large stones or other obstacles that may be in the ground and cut the sod or turf into strips. At the same time these strips are under-cut by the forward edge of the digging share 14. The said strips pass back upon the forward portion of the share 14, and the share severs the roots of the standing vegetation just below the sod or turf, and the sod or turf is cast up along the share 14 to the lower end of the trunk 20. When the wheels 60 are in mesh with the wheel 58, it will be seen that rotary movement is transmitted from the shaft 6 through the said intermeshing wheels to the shaft 56', and from thence through the intermeshing wheels 57 and 55 to the shaft 53. Thus the sprocket wheel 54 is rotated and through the sprocket chain 56 rotary movement is transmitted to the shaft 22 and the cylinder 40. As the shaft 22 rotates the sprocket wheel 23 rotates correspondingly and the sprocket chain 29 causes the blades 30 to move in an orbit along the elevator trunk 20. Thus the sod that is deposited at the lower end of the said trunk is engaged by the blades 30 and carried up along the bottom of the said trunk. Should the sod contain large stones or other obstructions, the upper portion 21 of the bottom of the trunk 20 will be depressed by the said obstructions, and the said stones may fall from the trunk 20. The roots and sod and other vegetable growth are passed from the upper end of the trunk 20 to the rotating rolls 32 and 33. As the peripheries of the said rolls are corrugated the material passed between the same is mutilated and crushed, and the particles of soil adhering to the vegetable growth are loosened therefrom. This material then falls into the chamber 38 upon the foraminous concave 39 and is engaged by the pins 41 mounted upon the periphery of the cylinder 40. The said pins carry the said material around with the exception of such particles of earth that may sift through the concave 39. From the chamber 38 the material falls into the hopper 44. Should any of the stalks, roots or blades of the vegetable growth adhere to the pins 41 of the cylinder 40, such material will be removed by the teeth 51 and 52 in the manner as above set forth. An operator may permit the accumulated material in the hopper 44 to fall therefrom by swinging the lever 48 as above described.

Having described my invention, what I claim as new, and desire to secure, by Letters Patent, is:—

1. An implement for destroying vegetable growth comprising a wheel mounted frame, an elevator located upon the frame, a mutilator located at the delivery end of the elevator, a foraminous concave located behind the mutilator, a cylinder journaled for rotation above the concave and having at its periphery radially disposed pins, and means for operating the elevator, the mutilator and the cylinder from the supporting wheels of the frame.

2. An implement for destroying vegetable growth comprising a wheel mounted frame, an elevator located upon the frame, a mutilator located at the delivery end of the elevator, a foraminous concave located behind the mutilator, a cylinder journaled for rotation over the foraminous concave, means for operating the elevator, the mutilator and the cylinder from the supporting wheels of the frame, a receiving hopper located behind the concave and a hinged gate for closing the hopper and means for manually swinging the gate to open position.

In testimony that I claim the foregoing as my own, I have hereto affixed my signature in the presence of two witnesses.

GEORGE ABNER NELSON.

Witnesses:
W. W. KING,
Z. EVANS.